(12) United States Patent
Hardy

(10) Patent No.: US 10,466,379 B2
(45) Date of Patent: Nov. 5, 2019

(54) METHOD FOR ENHANCING THE RESOLUTION OF A SEISMIC IMAGE

(71) Applicant: TOTAL SA, Courbevoie (FR)

(72) Inventor: Pierre Hardy, Pau (FR)

(73) Assignee: TOTAL SA, Courbevoie (FR)

( * ) Notice: Subject to any disclaimer, the term of this patent is extended or adjusted under 35 U.S.C. 154(b) by 405 days.

(21) Appl. No.: 14/896,618

(22) PCT Filed: Jun. 6, 2014

(86) PCT No.: PCT/IB2014/001341
§ 371 (c)(1),
(2) Date: Dec. 7, 2015

(87) PCT Pub. No.: WO2014/199225
PCT Pub. Date: Dec. 18, 2014

(65) Prior Publication Data
US 2016/0124102 A1    May 5, 2016

(30) Foreign Application Priority Data

Jun. 7, 2013    (EP) .................................... 13305771

(51) Int. Cl.
*G01V 1/36* (2006.01)
*G01V 1/32* (2006.01)

(52) U.S. Cl.
CPC ............. *G01V 1/362* (2013.01); *G01V 1/325* (2013.01); *G01V 2210/48* (2013.01); *G01V 2210/52* (2013.01); *G01V 2210/522* (2013.01)

(58) Field of Classification Search
CPC ...................................................... G01V 1/362
See application file for complete search history.

(56) References Cited

U.S. PATENT DOCUMENTS

| | | |
|---|---|---|
| 5,640,368 A | 6/1997 | Krebs |
| 2005/0197779 A1* | 9/2005 | Stinson .................. G01V 1/303 702/14 |
| 2010/0118652 A1 | 5/2010 | Schneider |

(Continued)

OTHER PUBLICATIONS

PCT International Search Report for PCT/IB2014/001341, dated Jan. 30, 2015, 4 pgs.

(Continued)

*Primary Examiner* — Manuel A Rivera Vargas
(74) *Attorney, Agent, or Firm* — Patterson Thuente Pedersen, P.A.

(57) ABSTRACT

A method for enhancing a physical parameter map in a zone of a seismic image. The dip of points of the image is obtained. For one of these points, called second point, a correction factor of a physical parameter is obtained with a residual move-out algorithm from a common image gather. A first point is selected on a line substantially perpendicular to the dip at the second point. The selection involves at least one parameter among whether the difference between the dip at the second point and the dip at the first point is below a first preset value; and the spacing between the first and the second point is below a second preset value. An inversion algorithm gives a corrected interval value of the physical parameter to update the physical parameter map.

14 Claims, 10 Drawing Sheets

(56) References Cited

U.S. PATENT DOCUMENTS

2012/0215501 A1\* 8/2012 Vinje .................... G01V 1/303
703/2
2012/0218861 A1\* 8/2012 Xia ....................... G01V 1/303
367/73

OTHER PUBLICATIONS

PCT Written Opinion of the International Searching Authority for PCT/IB2014/001341, 5 pages.
J. F. Schneider: "Residual moveout analysis and velocity determination for parametric media", SEG Technical Program Expanded Abstracts 2007, Jan. 1, 2007 (Jan. 1, 2007), pp. 2817-2821, XP055163449, DOI: 10.1190/1.2793052.

\* cited by examiner

METHOD FOR ENHANCING THE RESOLUTION OF A SEISMIC IMAGE

RELATED APPLICATIONS

The present application is a National Phase entry of PCT Application No. PCT/IB2014/001341, filed Jun. 6, 2014, which claims priority from EP Patent Application No. 13305771.1, filed Jun. 7, 2013, said applications being hereby incorporated by reference herein in their entirety.

FIELD OF THE INVENTION

The invention pertains to inversion methods for obtaining seismic images from seismic data.

BACKGROUND OF THE INVENTION

The invention more specifically relates to a method that enhances the resolution of a seismic image obtained using inversion algorithms.

Geological surveys often use seismic waves that propagate through a geological medium between a seismic wave emitter and a receiver. The seismic data thus obtained corresponds, at each detector, to seismic wave amplitudes as a function of time. To obtain a three-dimensional information on the composition of the geological medium, geological surveys measure multi-offset seismic data. In such multi-offset seismic data, a plurality of emitters and detectors is used, so that each emitted wave echoing from a reflector in the geological medium is perceived by different detectors, each detector being offset by a certain distance from the emitter. These apparent redundancies in seismic data provide valuable information regarding the reliability of a model of the geological medium constructed to fit this data.

In order to visualize the composition of the geological medium, this time-dependent data needs to be converted into depth-dependent data, where each echo corresponds to an interface called reflector or "seismic horizon". To obtain a seismic image from this data, a method called seismic tomography analyses the different arrival times of seismic waves and extracts information relating to velocities of waves through the medium. A seismic image therefore comprises a multitude of layers in the geological medium. Each layer corresponds to a medium having specific rheological properties.

If the rheological properties of the geological medium are known, notably the seismic wave velocities in that medium, it is possible to obtain a seismic image from the time-dependent data using a transformation called migration. The redundancy of the multi-offset seismic data can be used to check the reliability of the model by plotting butterfly diagrams in representations called "Common Image Gathers" (CIG), which represent the position of a point of a seismic horizon along a vertical axis corresponding to depth, as a function of the offset between an emitter and a receiver. If the depth of that point as a function of offset remains constant, the velocity model at that horizon is correct. If however, that depth increases or decreases as a function of the offset, it is an indication that the velocity is respectively too low or too high.

Seismic tomography can be seen in mathematical terms as an inverse problem comprising billions of linear equations involving hundreds of millions of unknowns. In ray-based tomography, these equations comprise unknowns among the rheological properties of the geological medium, for instance seismic wave velocities in the medium, and the position and shape of the seismic horizons at which waves reflect. Given the enormous amount of seismic data collected during a geological survey, no reliable method can solve these equations within an acceptable time frame while also providing precise enough solutions.

One possibility is to solve the inverse problem by using matrix methods such as a Cholesky decomposition. Nonetheless, such a matrix-based approach is tremendously demanding in computation power and memory storage.

Other methods involve iterative approaches. Among the most notorious iterative approaches, the Krylov method solves the system equation by equation. Nevertheless, this method requires many iterations, up to millions of iterations per equation, to converge towards a precise enough solution.

Generally, seismic inversion algorithms are designed to accept gross approximations which require fewer iterations, no more than a hundred and therefore provide images with fewer details, resulting in a lower resolution. Sadly, a lot of useful information that is contained in the fine details corresponding to small eigenvalues in a matrix representation of the data is lost. More specifically, vertical resolution is lost with a small number of iterations.

One common iterative approach using seismic tomography techniques to obtain a seismic image is called "Migration Velocity Analysis" (hereafter MVA). Starting from an initial velocity profile, which can be a random approximation of the expected velocities, migration velocity analysis involves four steps performed iteratively: provide a velocity profile, migrate the seismic data to obtain a seismic image, apply a residual move out algorithm, for example on common image gathers, to obtain correction factors of the velocity at several points of the image, and apply and inversion algorithm to obtain an updated velocity profile based on these corrected factors. For example, a Dix inversion algorithm or variations thereof are commonly used.

Another approach to increase the convergence towards a realistic velocity profile consists in manually picking horizons on a seismic image to fix points and simplify the inverse problem. Nevertheless, manually picking horizons is a tedious task which is also prone to human errors. It cannot be automatically implemented in a systematic way to pick a number of horizons providing realistic results using simplified inversion algorithms involving MVA. Sometimes, picking the horizons can be facilitated by orienting horizons along the dip on a seismic image. Nevertheless, these methods involve manual picks which fail to overcome the drawback of human intervention.

Therefore, due to the problems of gross iteration algorithms resulting in lower resolutions, and the lack of automated procedures to implement MVA using simplified inversion algorithms, a method that would allow an enhancement of the resolution of a seismic image is sought.

SUMMARY OF THE INVENTION

To overcome these drawbacks, the invention provides a method for enhancing a physical parameter map in a zone of a seismic image. This method comprises:

/a/ obtaining the zone of the seismic image, said zone comprising a set of points;
/b/ obtaining a dip at each point in the set of points;
/c/ selecting at least a first point in the set of points, and a second point in the set of points, said selection being based on at least one parameter among:
  the difference between the dip at said second point and the dip at the first point is below a first preset value; and the spacing between the first point and the second point is below a second preset value;

/d/ obtaining a common image gather associated with the second point in said set of points;

/e/ applying a residual move-out analysis algorithm to the common image gather to obtain a correction factor of the physical parameter at said second point;

/f/ applying an inversion algorithm to points between the first point and the second point in the set of points and along a line joining said first point and second point, to obtain an interval value of said physical parameter to update the physical parameter map.

The invention applies a ray-based tomography treatment of seismic images to a portion of a seismic image called a "zone" thereof. The invention aims to extract an interval value of a physical parameter which can be used to update a model of a probed geological medium, called "physical parameter map". The physical parameter can for example be a seismic wave velocity or an elasticity coefficient of the geological medium.

The invention enhances a physical parameter map by providing finer details in areas requiring a more precise model. In that respect the method enhances the resolution of a physical parameter map.

The invention provides a significant improvement over existing inversion algorithms in that it allows a selection of a portion of a seismic image requiring specific enhancement and relies on fully automated and systematic steps. The method can also be systematically applied to the entire seismic image, in which case the zone corresponds to the whole seismic image.

Another major improvement over prior art methods is that the invention uses a matrix-free approach to provide an interval value for a physical parameter and then update a physical parameter map, such as a seismic wave velocity profile.

The purpose of the invention is to facilitate the extraction of seismic data regarding fine details of the geological medium. These fine details are hard to extract using standard algorithms because they require massive computing power and need to solve all of the inverse problem to obtain the eigenvalues of interest in a matrix approach.

The method of the invention more specifically uses information from the dips of a seismic image. These dips can be calculated using algorithms commonly used by geophysicists. The dips provide an indication of the likely orientation of a horizon. The dip at a point of a horizon gives the direction of the tangent to the horizon at that point. It is assumed that any error in the physical parameter map can be attributed to data comprised between two points of two locally parallel horizons, having similar dips along a perpendicular seismic ray path. Therefore, the dips are used to pair points of the seismic image two by two along seismic ray paths perpendicular to the dips of these pairs.

To create such pairs of points, the invention uses at least one of two parameters.

One parameter is the similarity between the dips of two points of a pair, given that a seismic ray cannot reasonably be perpendicular to two horizons if the dips at the intersections of the ray with the horizons are different. This parameter can be met by introducing a first preset value. This value can for example be a value of a scalar product between the unitary vectors perpendicular to the dips at each of the two points. For example, the points may be paired if this scalar product has an absolute value above 95%.

A second parameter is the distance separating both points of a pair. To extract fine details from seismic data, it is necessary to take into account as many of the discontinuities in the seismic image as possible. If two points of a pair of points are on horizons that are spaced too far apart and intermediate horizons with different dips are skipped in the process, the method may not provide a substantial enhancement of the physical parameter map. Furthermore, when horizons are spaced too far apart, any error relating to the perpendicularity of the ray path to the dip is amplified. A second preset value for the spacing between two points can for example be defined as being a value above which a ray normal to the first point misses the second point by more than 5% of the distance separating the first point and second point.

The invention relies on the observation that if two dips along a same normal ray path are roughly the same, any error introduced on a physical parameter such as the seismic wave velocity can be extracted from data due to the propagation of seismic waves in the area between the two dipped horizons. Indeed, the seismic data comprises two echoes, one from each dipped horizon. Therefore, any error on the velocity of the medium above the first horizon met by the seismic wave can be subtracted from the seismic data of the wave echoed from the second, deeper seismic horizon.

The line along which an inversion algorithm is applied is to be understood as being the shortest path connecting the first point to the second point. In a discrete system comprised of a set of points, such a line may not be a straight line but rather a path formed of adjacent data points that are all crossed by the shortest line connecting the first point to the second point.

Advantageously, the first preset value may be based on a scalar product between a unitary vector perpendicular to the dip of the first point and a unitary vector perpendicular to the dip of the second point.

Advantageously, the second preset value is a value above which a ray normal to the first point misses the second point by more than 5% of the distance separating the first point from the second point.

Advantageously, the selection of a first point in step /f/ can further be based on the parameter:

for a distance between the second point and points of said set of points smaller than a third preset value, a dip gradient is below a fourth preset value.

To improve the consistency of the method of the invention, it is possible to introduce such a parameter which takes into account the environment surrounding a point on a horizon. If the second point is located in a zone which comprises too many inhomogeneities, it will be apparent from the dip gradient in the vicinity of this point. Therefore, it is likely that such zones may provide poor results in terms of interval value. The third preset value can advantageously be chosen on a parameter similar to that used for determining the second preset value. The fourth preset value can be calculated based on a global estimation of the mean dip gradient in the seismic image.

Advantageously, a common image gather associated with the first point in said set of points may be obtained and a correction factor of the physical parameter at said second point may be obtained by applying a residual move-out analysis algorithm to the common image gather associated with the first point. Step /f/ may use the correction factor of the physical parameter at said first point and the correction factor of the physical parameter at said second point to obtain an interval value of said physical parameter to update the physical parameter map.

The reconstruction of an updated physical parameter map may be done horizon by horizon from the surface down to the lowest detectable reflector. In such cases, a correction factor of the physical parameter at the first point may already be available when implementing the inversion algorithm. In some situations, for example when the method of the invention is applied to a zone located in a deeper section of a seismic image, the inversion step /f/ may require a determination of a correction factor of the physical parameter at the first point as well as at the second point.

According to an embodiment of the invention, each point of said set of points may be associated to x, y, z coordinates and to a physical parameter v(x,y,z) at said point of coordinates x, y, z, the method further comprising the introduction of a weighting function W defining a weighting factor w(x,y,z) for each point of the set of points, a physical parameter profile Vp(x,y,z) being obtained at each point of coordinates x, y, z using the formula:

$$Vp(x,y,z)=V(x,y,z)*W(x,y,z)/\Sigma W(x,y,z)$$

Where $\Sigma W(x,y,z)$ is the sum of all the weighting factors of the set of points.

The introduction of a weighting function W may provide the advantage that data that is deemed to be less reliable may have less impact on the corrected profile, for instance a corrected velocity profile by associating it to a small weighting factor. In an iterative process, the updated profile will lessen the contribution of exotic data points on the physical parameters of neighboring data points. This in turn increases the convergence of the method towards a more realistic model of the probed geological medium.

An enhanced migration velocity analysis comprising a predetermined number of iterations may also be implemented, said enhanced migration velocity analysis comprising:
obtaining multi-offset seismic data; and for each current iteration of said predetermined number of iterations, implementing the following sequence of steps:
/a'/ transforming multi-offset seismic data into a depth-migrated seismic image using a physical parameter map;
implementing steps /a/ to /f/.

This enhanced migration velocity analysis combines traditional iterative migration velocity analysis with the method of the invention, insofar as it focuses the effort on areas of the seismic image requiring a particular improvement in the resolution. This iterative process typically requires few iterations, no more than a hundred, which renders the method at least as time efficient as existing fast inversion algorithms used in MVA.

Although the term "velocity" in migration velocity analysis refers to a specific physical parameter of the geological medium, it is not to be understood in a limitative way. In fact, the same method can be applied to iteratively compute any physical parameter be it for example a velocity, an elasticity coefficient or any anisotropy factor of the geological medium.

Advantageously, the depth of the first point as a function of offset may be determined prior to a current iteration, and the enhanced migration velocity analysis may be continued until said depth as a function of offset differs from the depth at zero-offset by less than a fifth preset value.

Common image gathers, migrated in the depth domain, provide a particularly reliable indicator of the deficiencies of a model of a geological medium. The redundancy in seismic data can be used in common image gathers to extract a correction factor for a physical parameter such as velocity from a butterfly diagram. The curvature of the depth of a point in a seismic image as a function of offset provides information on the error in the physical parameter of the geological medium at that point. When the curvature of this offset-dependence of the depth disappears and when the depth is constant no matter the offset, the value of the physical parameter is reliable. This reliability arises from the consistency between the simulated model and the seismic data. Therefore, when this consistency holds, there is no need to pursue the iterative process at this portion of the seismic image.

The fifth preset value can be chosen by a user of the program, depending on the level of accuracy sought. Otherwise, a default value can be input, for example a physical parameter which changes by less than 2% as a function of offset.

A first physical parameter value profile may be estimated based on a migration velocity analysis applied to the multi-offset seismic data.

The first current physical parameter value profile can be chosen based on different criteria. It can be totally random. It may be constructed based on field measurements, for example drills, conducted in the geological medium. It can also be the output of a first, gross migration velocity analysis conducted using existing methods.

Advantageously, the seismic ray path may be a zero-offset seismic ray path.

When the seismic ray follows the same path from the emitter to the horizons as it does from the horizons to the detector, it is possible to subtract the contribution of all the horizons located above a pair, formed of a first point and a second point, to the calculated value of the physical parameter. The method can then be implemented in a local area of an image surrounding the pair of points in the zone.

The inversion algorithm may be based on a Dix inversion algorithm.

Using a Dix inversion algorithm provides the advantage that such algorithms are already well-tested and easy to implement and incorporate into a more sophisticated seismic data treatment routine.

According to another embodiment, the physical parameter may be a seismic wave velocity.

According to another embodiment, the physical parameter may be an elasticity coefficient of a medium through which seismic waves propagate.

The invention also pertains to a non-transitory computer readable storage medium, having stored thereon a computer program comprising program instructions, the computer program being loadable into a data-processing unit and adapted to cause the data-processing unit to carry out:
/a/ obtaining the zone of the seismic image, said zone comprising a set of points;
/b/ obtaining a dip at each point in the set of points;
/c/ selecting at least a first point in the set of points, and a second point in the set of points, the first point being within a cone centered on a line perpendicular to the dip at the second point, said selection being based on at least one parameter among:
the difference between the dip at said second point and the dip at the first point is below a first preset value; and
the spacing between the first and the second point is below a second preset value;
/d/ obtaining a common image gather associated with the second point in said set of points;
/e/ applying a residual move-out analysis algorithm to the common image gather to obtain a correction factor of the physical parameter at said second point;
/f/ applying an inversion algorithm to points between the first point and the second point in the set of points and along a line joining said first point and second point, to obtain an interval value of said physical parameter to update the physical parameter map;

when the computer program is run by the data-processing device. Steps /a/ to /g/ may be further enhanced with any of the embodiments and advantageous solutions proposed above.

BRIEF DESCRIPTION OF THE DRAWINGS

The method of the invention will be better understood by reading the detailed description of exemplary embodiments presented below. These embodiments are illustrative and by no means limitative. They are provided with the appended figures and drawings on which.

For the sake of clarity, the dimensions of features represented on these figures may not necessarily correspond to the real-size proportions of the corresponding elements. Like reference numerals on the figures correspond to similar elements or items.

DETAILED DESCRIPTION OF THE DRAWINGS

The purpose of geological surveys is generally to acquire data that can be used to build a realistic model of a geological medium. A seismic image is built from such seismic data. This image may represent a map of a physical parameter of the geological medium. The invention relates to the inversion problem of finding a model that fits seismic data. It more specifically uses a technique called seismic ray-based tomography and provides a local inversion method that specifically enhances the details obtained on portions of a seismic image. It can also be applied to an entire seismic image as well.

The following description focuses on an example in which the physical parameter is a seismic wave velocity. In fact, it is to be noted that the same method can be applied to extract information about the elasticity of the geological medium. More generally, the method described below can be applied to any physical parameter that can be extracted from seismic data, given that many of these physical parameters can be related through known physical equations.

Figure 1:
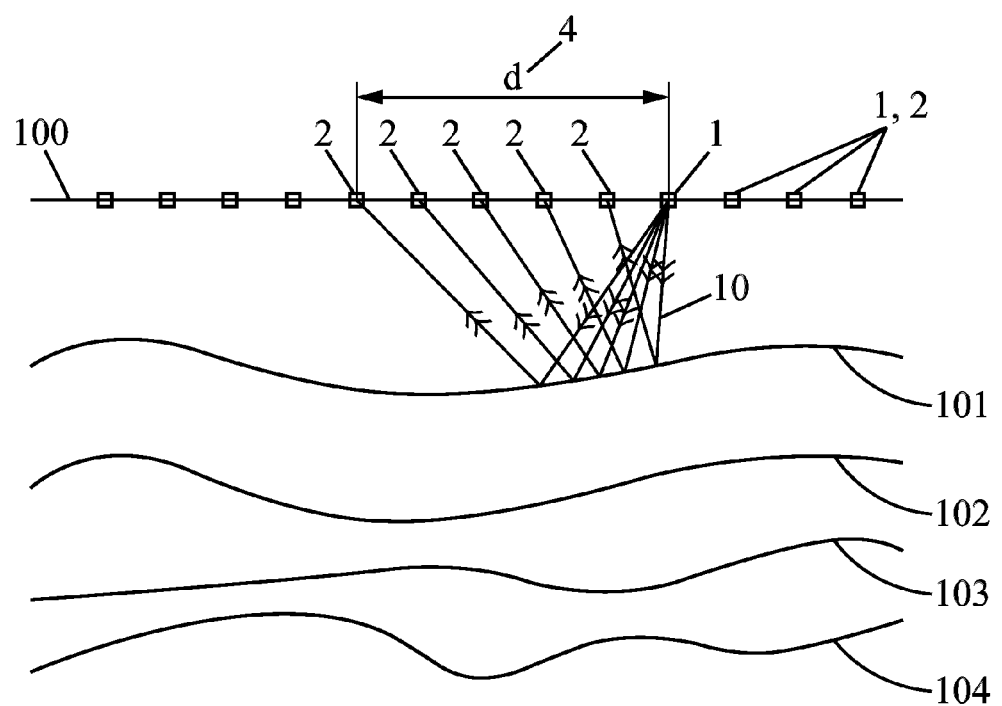
FIG. 1 is a schematic representation of a multi-offset seismic data acquisition configuration featuring several seismic rays.

FIG. 1 provides an illustration of several seismic rays 10 propagating through a geological medium from an emitter 1 to receivers 2 on the surface 100. The acquired data features redundancies insofar as one signal emitted from the surface 100 is collected by several receivers, offset by a distance d form the receiver. This offset 4 can be used to represent data in common image gathers, as will be described below.

The rays 10 are reflected at each interface, the interfaces or reflectors being called "seismic horizons" 101, 102, 103, 104 of the geological medium.

Figure 2:
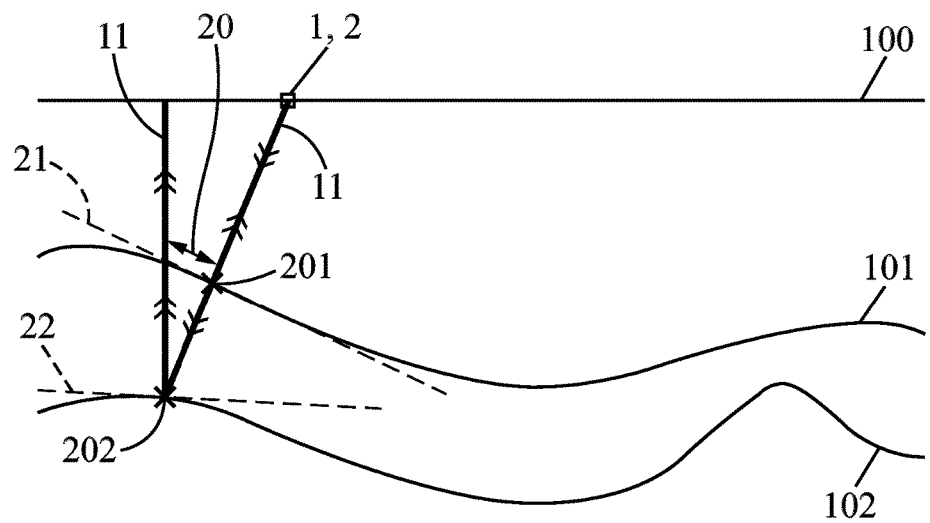
FIG. 2 is a schematic representation of two seismic rays reflected at dipped horizons.

In a simple model, all the horizons would be horizontal, which would render the inversion of seismic data fairly simple. In reality, seismic horizons 101, 102 can come in all shapes as illustrated for example on FIG. 2. A seismic ray that intersects a horizon will be reflected and diffracted. The tangent 21, 22, to the horizon at point 201 where the seismic ray intersects the horizon is oriented along the dip of the horizon at that point 201. In FIG. 2, ray 11 is perpendicular to the dip 21 at point 201. It is reflected and follows the same path upwards from the horizon 101 to the detector 2 as downwards from the emitter 1 to the horizon 101. In such a configuration, the data is considered as a zero-offset signal because the emitter 1 and detector 2 are at the same location on the surface 100.

Seismic ray 11 further propagates to a second horizon 102 which it intersects at point 202 having a dip 22. Ray 11 is not perpendicular to ray 22 and is therefore reflected along a path which is not a zero-offset path to the surface 100. Ray 11 intersects the first horizon 101 with an offset 20 from point 201. If this offset is too big, the medium through which ray 11 propagates from horizon 102 to the surface 100 may differ from that through which ray 11 propagates from the surface 100 to the first horizon 101.

Figure 3:
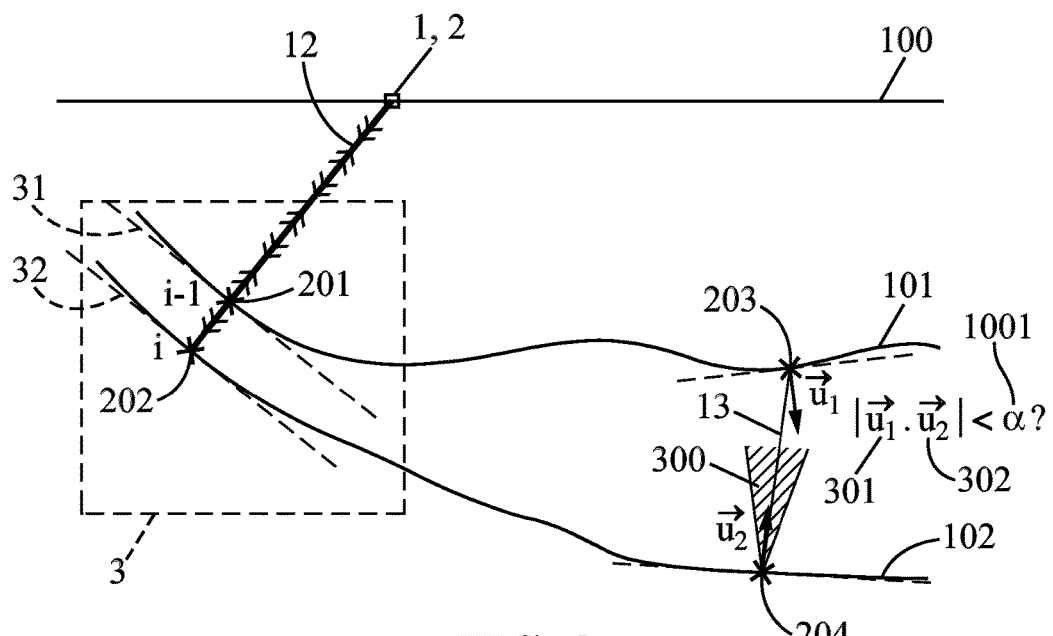
FIG. 3 is a schematic representation of two seismic rays reflected at two parallel dipped horizons and another seismic ray that is not parallel to the dipped horizon it intersects.

The method of the invention consists in applying an inversion algorithm to an area of a seismic image located between a first point 201 and a second point 202 belonging respectively to a first horizon 101 and a second horizon 102. FIG. 3 illustrates an exemplary situation in which a zero-offset ray 12 reflects at two parallel horizons 101, 102, having substantially similar dips 31, 32, in a zone 3 of a seismic image.

The zone 3 can be chosen as being the seismic image as a whole, or focus more specifically on portions which are deemed to require a finer treatment to provide a more accurate velocity map. The selection of the zone of the seismic image corresponds to step /a/, or 501 on FIG. 5.

In the embodiment of FIG. 3, any error committed on the velocity of the geological medium above the first horizon 101 can be subtracted from the seismic image when applying an inversion algorithm. Indeed, the contribution to the seismic signal from the portion of ray 12 reflected at the first horizon 101 and the portion of ray 12 reflected at the second horizon 102 is identical above the first horizon 101. The only difference in the seismic signal resides in the portion of ray 12 propagating in the medium located between points 201 and 202.

One aspect of the invention related to the parameters used to choose the first point 201 and second point 202. Ideally, both points belong to neighboring horizons and are associated with identical dips 31, 32. In practice, such a situation may not occur.

To identify which points best fit a requirement that would enable a satisfactory enhancement of the velocity profile, the invention uses the dip of points of the seismic image. Using known methods, the dip at each point of a set of points in the zone 3 is obtained. This is performed at step /b/ or 502 on FIG. 5. Then, a selection of a second point 202 and a first point 201 is done based at least on a dip similarity and/or a point spacing condition. This point selection step is referred to as step /c/ or 503 on FIG. 5.

Either one of the first point 201 or the second point 202 can be chosen randomly. The other point is then located within a cone 300 centered on an axis corresponding to the line perpendicular to the dip 31, 32 of that chosen point.

In the case represented on the left side of FIG. 3, assuming point 201 is chosen first, the best choices for the second point lie on the line perpendicular to dip 31 which happens to be on ray 12. The best point is a point lying on a horizon having a dip 32 equal or substantially equal to dip 31. One parameter that can summarize these conditions is that the difference between the dip at said second point and the dip at the first point is below a first preset value alpha 1001. One convenient way of defining such a first preset value 1001 is to consider the scalar product between a unitary vector perpendicular to dip 31 and a unitary vector perpendicular to dip 32. If the absolute value of the scalar product is for example above 0.95, the two points may be considered as acceptable choices.

To determine a first preset value 1001, it is possible to calculate a global map of all the moduli of scalar products between pairs of unitary vectors 301, 302 perpendicular to points of the zone 3. A first preset value equal to the scalar product corresponding to the value of the top 5% moduli of scalar products can then be selected.

On the right side of FIG. 3, another example of points that may be acceptable choices is represented. The second point 204 is on a ray 13 connected to the first point 203, but not along a line perpendicular to either the dip at the first point 203 or the dip at the second point 204. This situation may be acceptable when the ray 13 is within a cone 300 having a central axis corresponding to the line perpendicular to the dip at point 204.

Another parameter that may be used to choose a pair of points 201, 202 is to look at the spacing between the first point and the second point. Indeed, the further away point 201 is from point 202, the more sensitive becomes the perpendicularity parameter discussed above.

This second parameter is advantageously connected to the perpendicularity parameter discussed above. More specifically, the spacing between the first and the second point may be set to be below a second present value beta 1002. The second preset value may be a value above which a ray 11 as represented on FIG. 2, normal to either the second point or the first point, misses the other point on the other horizon by more than 5% of the distance separating the first point from the second point. On FIG. 2, that would correspond to distance 20 being less than 5% of the distance separating points 201 and 202. It is possible to combine the first and second selection parameters.

When all the pairs of points meeting the conditions of the perpendicularity parameter are identified, it is also possible to discriminate among these pairs of points those which meet the conditions of the second "spacing" parameter.

As an alternative way of selecting a first preset value 1001 and a second preset value 1002, it is possible to select a fixed number of pairs of points, for example the one hundred pairs that best fulfill the perpendicularity and/or spacing parameters.

It is possible to apply further parameters for selecting the first point 201 and the second point 202. In particular, to avoid selecting points in areas that comprise an important amount of local inhomogeneities, it is possible to preset a third value gamma corresponding to a distance around the first point 201 and/or the second point 202. Within that predefined distance around the first point 201 and/or second point 202, the dip gradient is expected to be below a fourth preset value. Similarly to what has been described above, the third and fourth preset values can be selected as being the 5% or 2% or 1% highest dip gradients in the zone 3 or the entire seismic image. This environmental parameter may be combined with the perpendicularity parameter and spacing parameter. In particular, the environmental parameter avoids considering pairs of points in areas that are likely to provide inaccurate estimates due to unreliable data, seismic fault lines or excessive nonlinearities.

Once at least one pair of points formed of a first point 201 and a second point 202 is formed, the method consists in obtaining a Common Image Gather (CIG) for either the first point 201, the second point 202, or both. This is done at step /d/ or 504 on FIG. 5.

Figure 4:
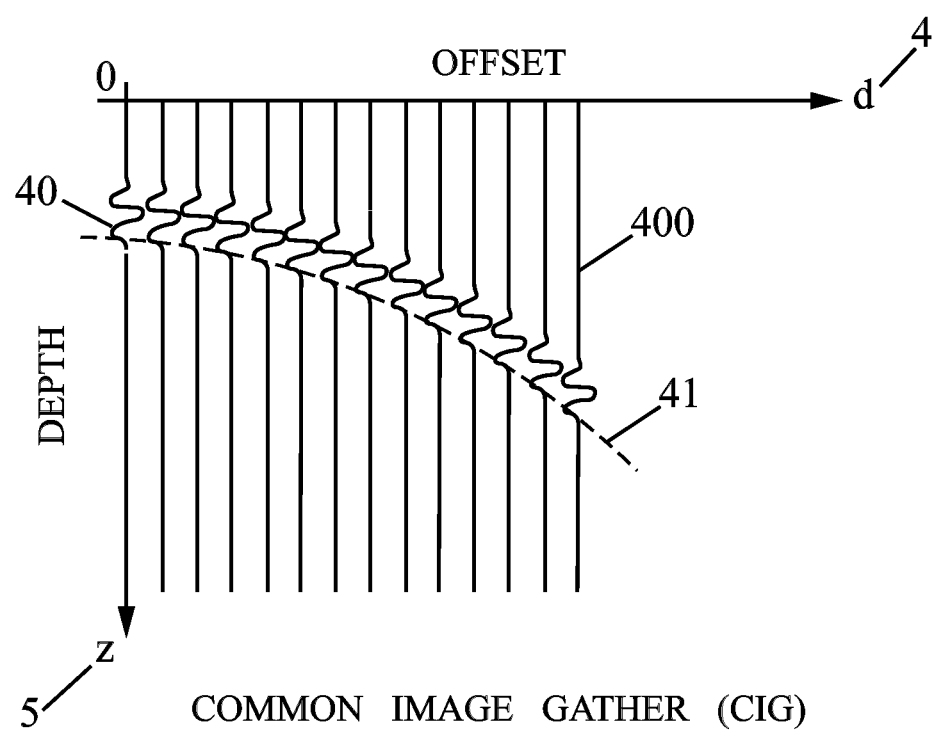
FIG. 4 is a schematic representation of a butterfly diagram of a common image gather.

An example of a butterfly diagram for a common image gather is represented on FIG. 4. This diagram uses multi-offset seismic data 600. To get a CIG, a seismic image 701, 702, 703, 704, obtained from a transformation of the time-dependent seismic data into depth-migrated data using a velocity profile is used. There are at least as many depth-migrated seismic images available as there are offsets 4, d in the seismic data. The depth of a given point is identified in each depth-migrated seismic image. The butterfly diagram of FIG. 4 represents a depth-migrated seismic signal as a function of offset 4, d. The zero-offset signal 40 is not located at the same depth as the other signals on depth-migrated seismic traces 400. The curvature of the depths as a function of offset can be fitted by a function 41, that can for example be hyperbolic or elliptical. When the curvature tends to increase the depth with offset 4, it is an indication that the velocity in the model is too high. When the curvature tends to decrease the depth with offset 4, it is an indication that the velocity in the model is too low.

Figure 5:
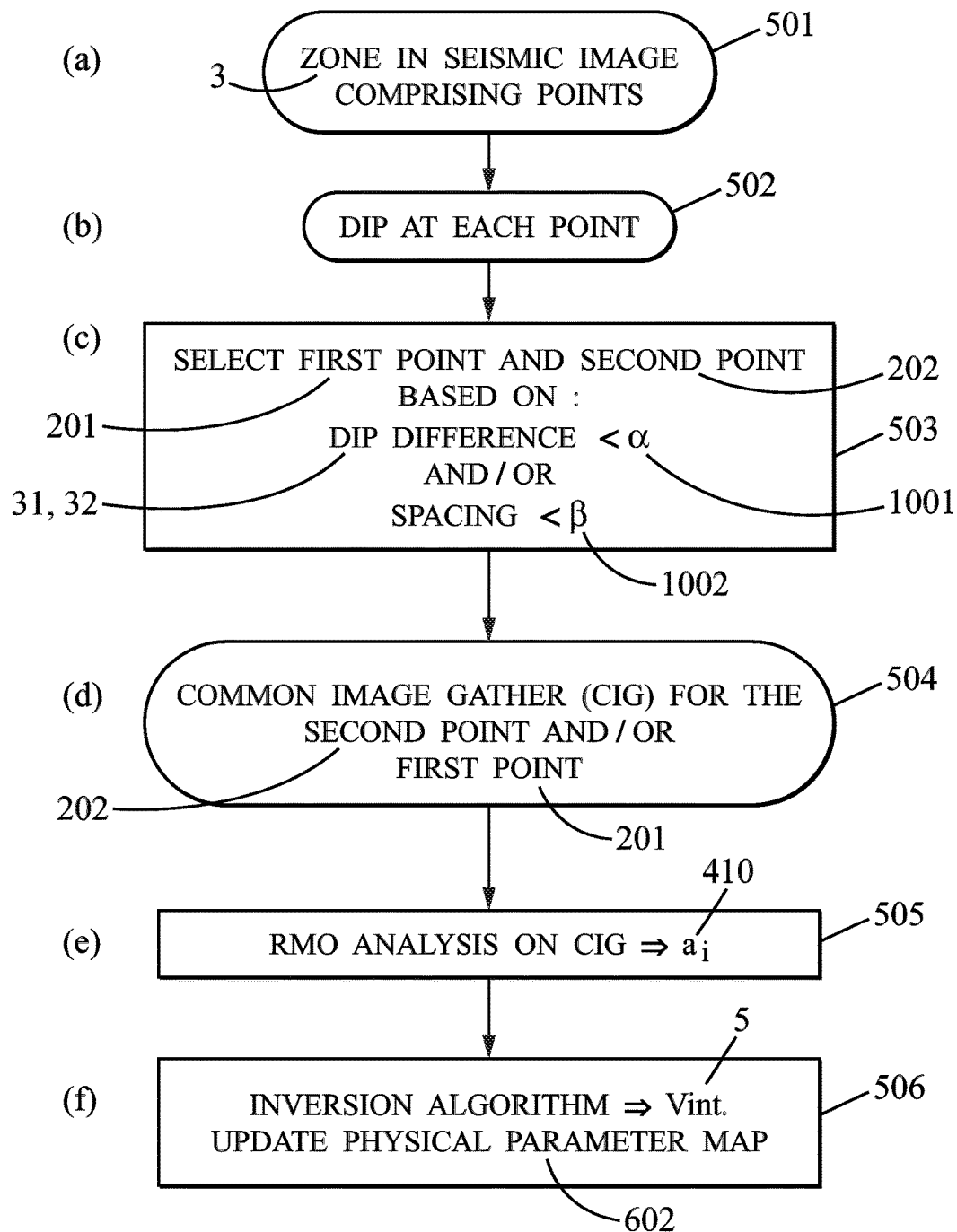
FIG. 5 is a flowchart of an embodiment of a method to enhance a physical parameter map.

A residual move-out algorithm, known to geophysicists, can be implemented to extract a correction factor $a_i$, 410 for the velocity at point i, 202, as represented by step /e/ or 505 in FIG. 5. Another correction factor $a_{i-1}$ can be obtained for the velocity at point i−1, 201.

Then, an inversion algorithm, chosen among any known inversion algorithm, can be applied to find an interval velocity Vint, 5 as represented by step /f/ or 506 on FIG. 5. A Dix inversion algorithm may be particularly easy to implement. According to this algorithm, the interval velocity Vint, 5 can be expressed as:

$$Vint^2 = (a_i^{2*}Vrms_i^{2*}T_i - a_{i-1}^{2*}Vrms_{i-1}^{*}T_{i-1})/(T_i - T_{i-1})$$

where $Vrms_i$ is the velocity at point i, 202, $Vrms_{i-1}$ is the velocity at point 201, $T_i$ is the zero-offset travel time for the ray 12 reflected at horizon 102, and $T_{i-1}$ the zero-offset travel time for the ray 12 reflected at horizon 101.

Sometimes, it may be possible to avoid calculating the correction factor ai for the velocity at point 201 when this information is already available because of a similar calculation performed at a nearby pair of points, or when the method is implemented in a sequence from the surface 100 to the lowest reflector probed in the geological medium.

This step /f/, 506 is concluded by integrating the interval velocity Vint, 5 into the velocity profile, or velocity map 602, thereby obtaining an upgraded velocity map 603.

Since the method performs a selection of the pairs of points used to compute an interval velocity, it may leave gaps in the seismic image where finer details are not available because no pair of points can reasonably be selected. To circumvent what may at first seem to be a deficiency, the method of the invention may be further improved by expanding the results obtained along a seismic ray to neighboring points of the seismic image assumed to represent locations of the geological medium displaying similar rheological properties. To avoid making harsh assumptions on the velocity at points around the ray on which a velocity has been computed, the invention introduces a weighting function W, defining a weighting factor w in all points of the zone 3. Assuming a seismic image defined in three dimensions along axes of coordinates x, y, and z, the weighting factor w(x,y,z) can be defined depending on the local dip gradient. In areas having a high dip gradient, it may be wise to define a low weighting factor w(x,y,z); In more homogenous regions of the seismic image, the weighting factor can be higher.

The interval velocity Vint is expended to neighboring points of coordinates x,y,z, by weighting its value at each neighboring point with the local weighting factor w(x,y,z), so that the contribution of this interval velocity is reduced in neighboring points in which it is considered as potentially unreliable. A formula for weighting the velocity Vp(x,y,z) at neighboring points can be expressed as:

$$Vp(x,y,z)=V(x,y,z)*W(x,y,z)/\Sigma W(x,y,z)$$

Where $\Sigma W(x,y,z)$ is a sum of all the weighting factors of the set of points.

The exemplary embodiments described above provide a method for obtaining an updated velocity map 603 by calculating an interval velocity, implementing steps /a/ to /f/ once. Generally, seismic ray-based tomography uses an iterative approach to converge towards a realistic solution using an algorithm called "Migration Velocity Analysis" (MVA). MVA starts from an initial velocity profile, which can be a random approximation of the expected velocities, and comprises four steps performed iteratively. First a velocity profile is provided. Then the seismic data is transformed by migrating it using the velocity profile to obtain a depth-migrated seismic image. Then, a residual move out algorithm is applied on on common image gathers, to obtain correction factors of the velocity at several points of the image. Finally, an inversion algorithm is applied to obtain an updated velocity profile based on these correction factors. The updated velocity profile is used to migrate the original data again to pursue the same algorithm iteratively until a satisfactory result is obtained.

Figure 6:
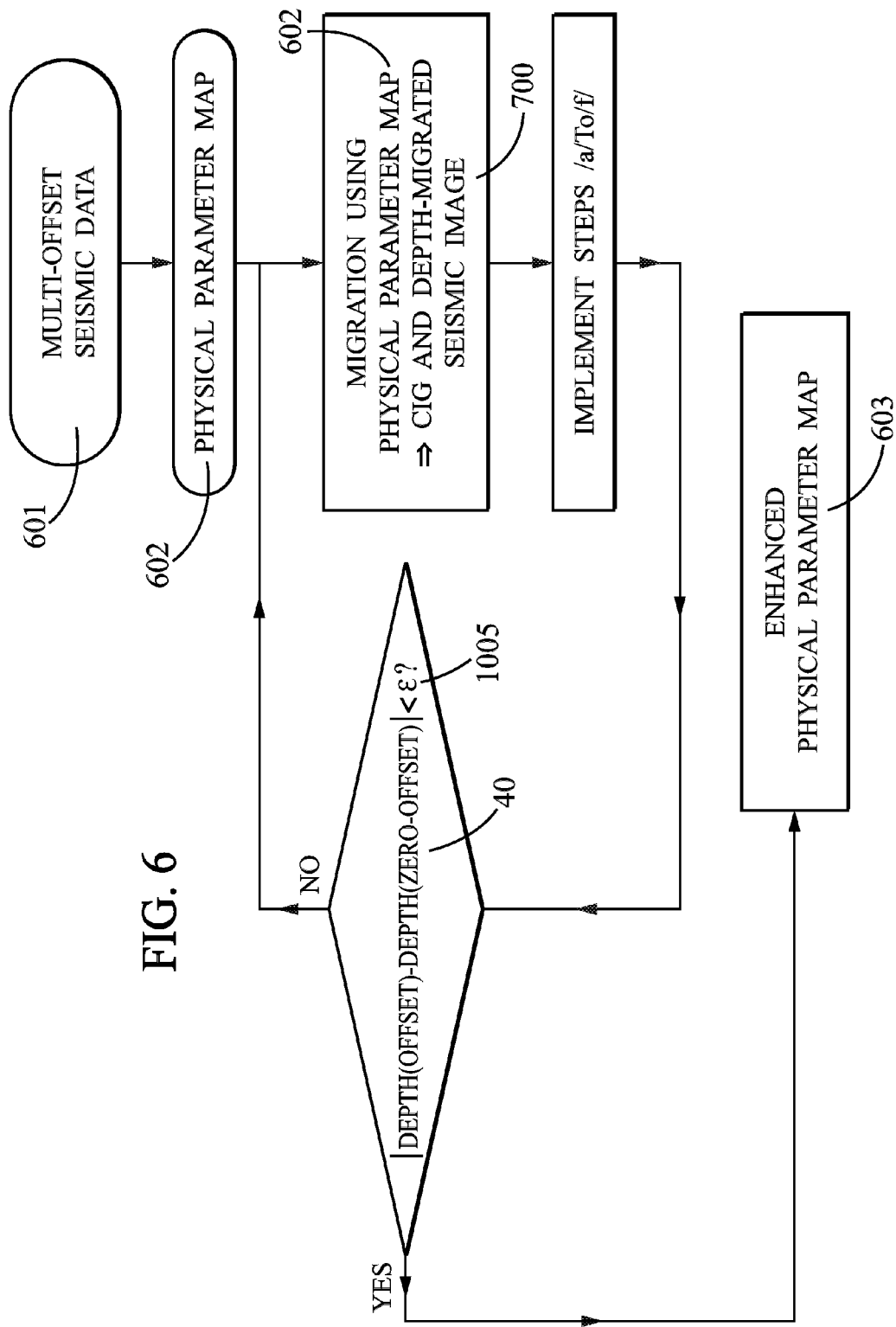
FIG. 6 is a flowchart of an enhanced migration velocity analysis algorithm.
Figure 7A:
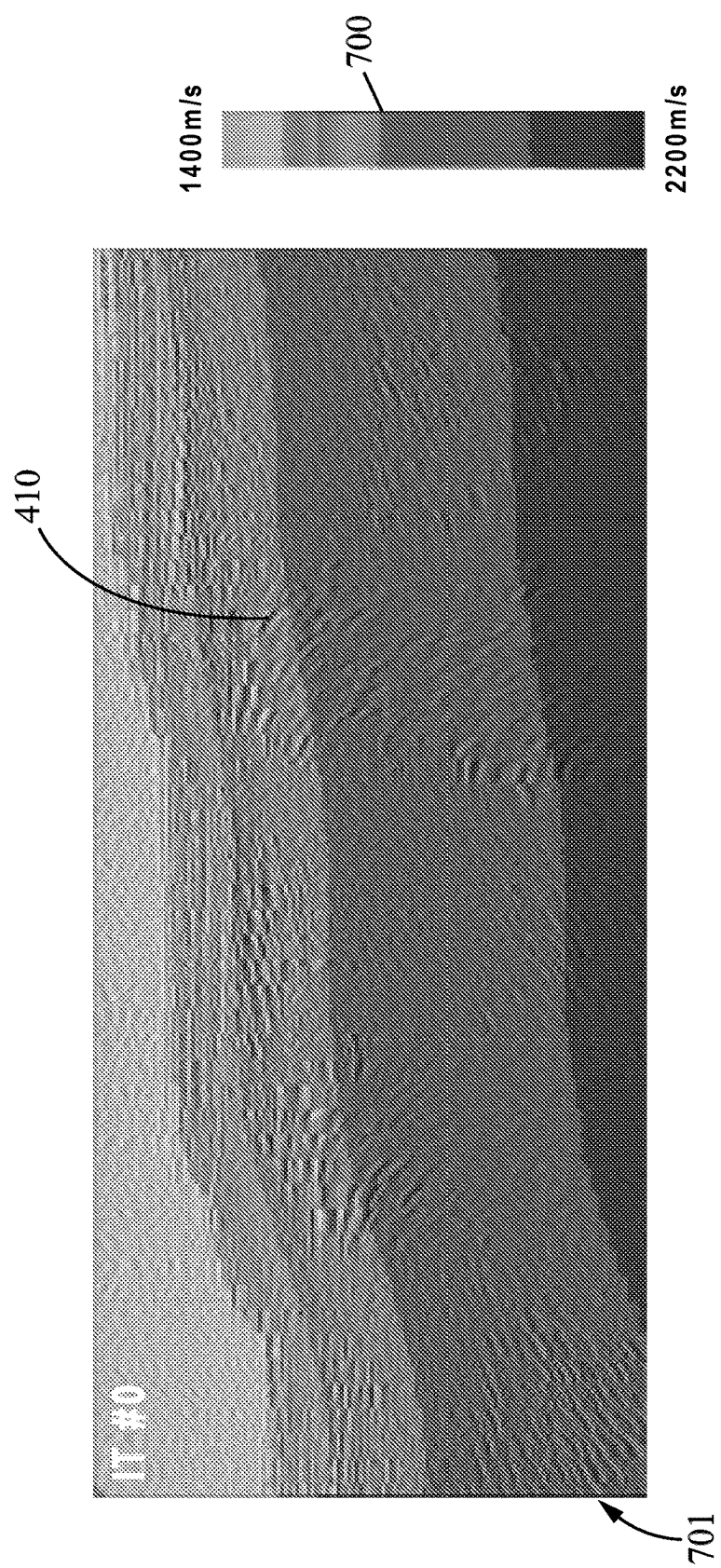
FIG. 7a to 7d are schematic representations of a seismic image displaying the velocity map of a geological medium after different numbers of iterations of the enhanced migration velocity analysis algorithm of FIG. 6, each seismic image being superposed with common image gathers.
Figure 7B:
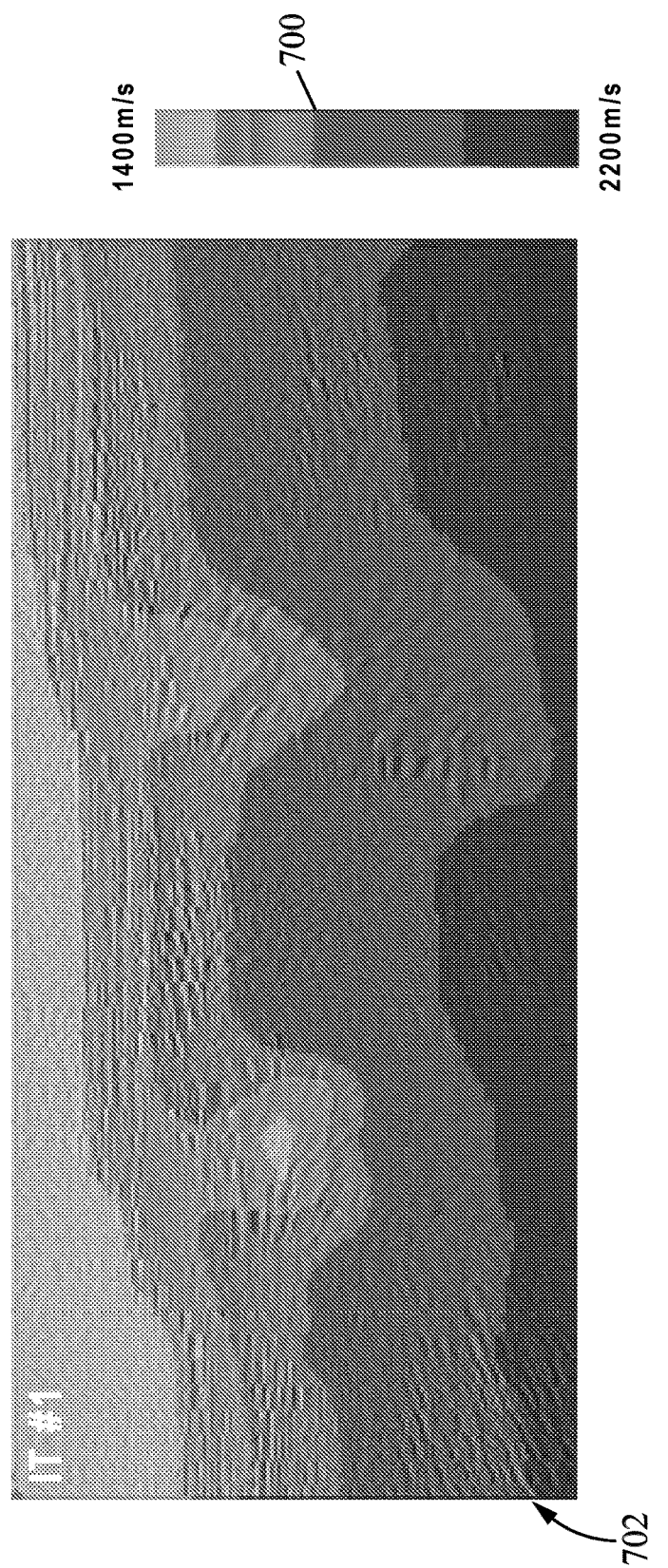
Figure 7C:
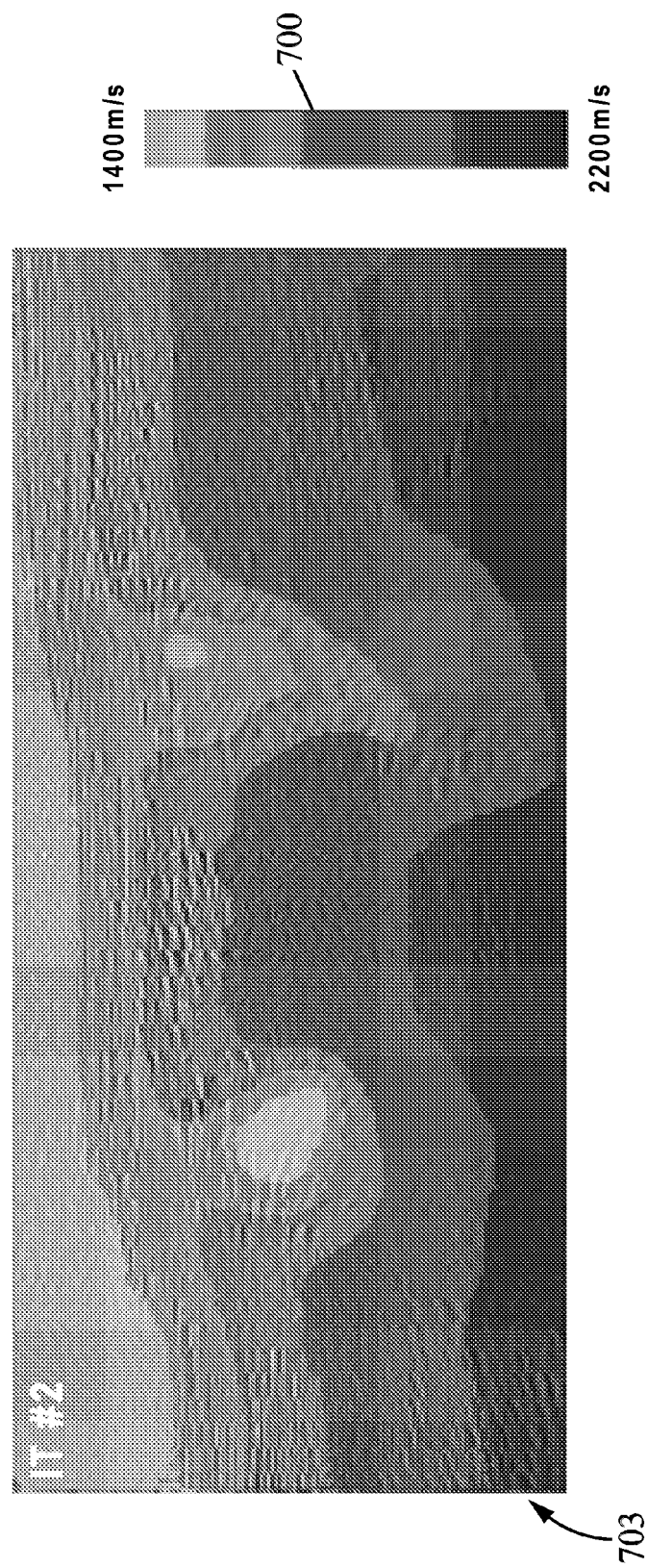
Figure 7D:
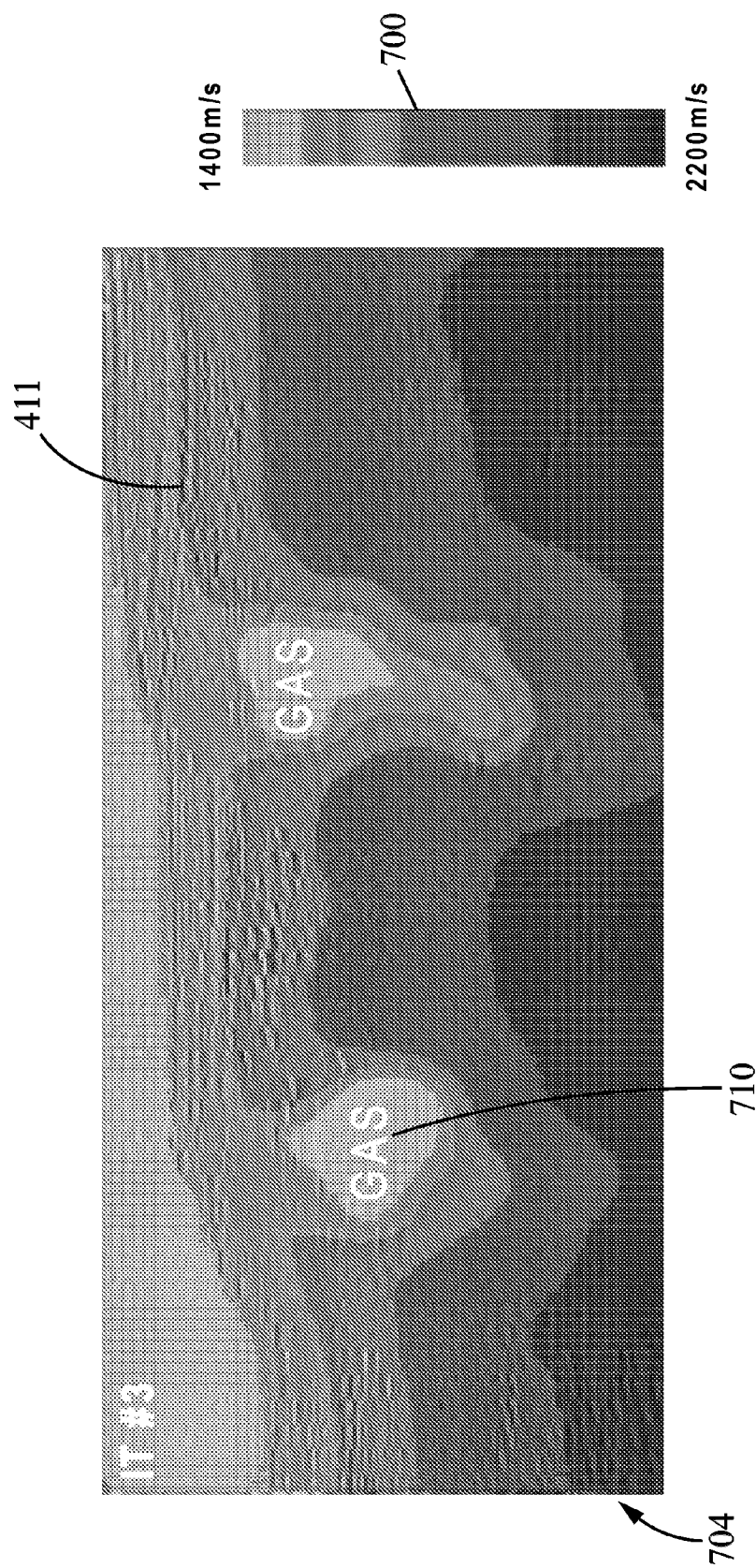

The method of the invention can also advantageously be coupled to an MVA algorithm to produce an "enhanced MVA". FIG. 6 provides a flowchart summarizing the main steps involved in such an enhanced MVA. The enhanced MVA involves multi-offset seismic data 601, and a velocity map 602. The velocity map can be provided by drills or based on an educated guess. It may also be the result of a first gross "standard" MVA applied to the data. The seismic data is migrated to obtain a seismic image and at least one CIG, preferably a CIG for a plurality of points of the seismic image. One way of selecting zone 3 described above is to locate areas within the seismic image having strange features, or inhomogeneities. Areas that may require an enhancement of the velocity map can also advantageously be identified by looking at the common image gathers. In areas where common image gathers display large curvatures of the depth as a function of offset, the velocity model may require an update. These areas are therefore convenient choices for zone 3.

Then, steps /a/ to /f/ are implemented in the identified zones. After step /f/, the curvature of function 41 is checked. Namely, the difference between the depth at zero-offset and the depth at the largest offset is compared to a fifth preset value epsilon 1005. If the absolute value of this difference is below the fifth preset value 1005, then the velocity map in the area surrounding that point is satisfactory. Otherwise, the MVA is pursued. The fifth preset value can be a fixed value, or a value based on the average difference calculated on the CIG of the points located outside of the selected zones 3.

It is to be noted that the selection of all the preset values alpha, beta, gamma, delta, epsilon enables an adjustment of the precision sought in the method. The stricter the conditions imposed by the preset values, the better the enhanced velocity map.

FIGS. 7a to 7d provides illustrations of seismic images 701-704 obtained after an increasing number of iterations in the enhanced MVA described above. Butterfly diagrams 410, 411 overlap the seismic images to indicate which areas of the image require particular attention. Although the initial velocity map does not indicate any particular feature in the probed geological medium, by the end of the enhanced MVA, two gas reservoirs 710 can be identified on the velocity map of the seismic image. A legend 700 is provided to discriminate between intermediate and low or high speeds in the geological medium.

Due to the simplified and systematic approach of the method described above, the method does not require excessive computational means to be implemented. The method can be performed quickly. It also does not suffer from the drawbacks of the prior art, insofar as it does not rely on human intervention to pick horizons or double check models. Every step of the method can be implemented by a machine with parameters that are well-defined mathematically. It is however also possible to adjust some parameters manually depending on the level of precision sought by a user of the method.

Figure 8:
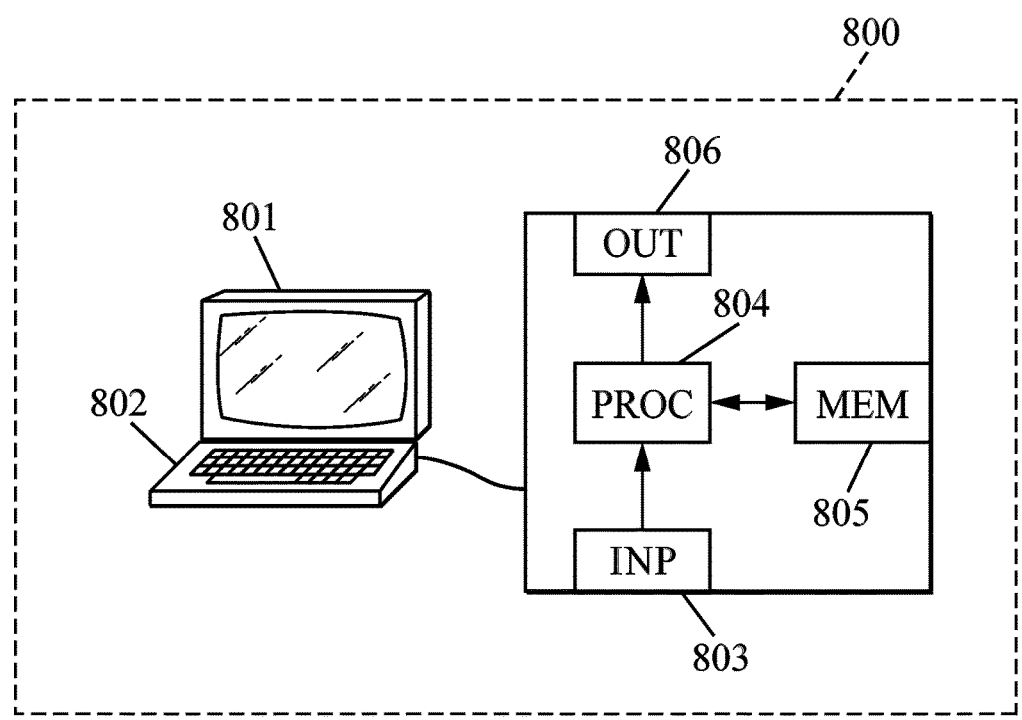
FIG. 8 is an exemplary embodiment for a non-transitory device that can implement the method of the invention.

The method described above may be implemented using a device, such as a computer system. One such possible computer system is represented on FIG. 8.

The computer system 800 comprises a computer, this computer comprising a memory 805 to store program instructions loadable into a circuit and adapted to cause circuit 804 to carry out the steps of the present invention when the program instructions are run by the circuit 804.

The memory 805 may also store data and useful information for carrying the steps of the present invention as described above.

The circuit 804 may be for instance:
  a processor or a processing unit adapted to interpret instructions in a computer language, the processor or the processing unit may comprise, may be associated with or be attached to a memory comprising the instructions, or
  the association of a processor/processing unit and a memory, the processor or the processing unit adapted to interpret instructions in a computer language, the memory comprising said instructions, or
  an electronic card wherein the steps of the invention are described within silicon, or
  a programmable electronic chip such as a FPGA chip (for "Field-Programmable Gate Array").

This computer comprises an input interface 803 for the reception of data used for the above method according to the invention and an output interface 806 for providing a stacked model.

To ease the interaction with the computer, a screen 801 and a keyboard 802 may be provided and connected to the computer circuit 804.

The invention is not limited to the embodiments described above and may encompass equivalent embodiments.

For example, although the above description concerns only one pair of points 201, 202, the method can be implemented simultaneously for a plurality of pairs of selected points, thereby reducing the time required to compute an enhanced velocity map.

The invention claimed is:

1. A method for creating an enhanced physical parameter map of a zone of a seismic image, the seismic image formed using a plurality of seismic waves and the application of seismic tomography, said method comprising:
/a/ obtaining the zone of the seismic image, said zone comprising a set of points;
/b/ obtaining a dip at each point in the set of points;
/c/ selecting at least a first point in the set of points, and a second point in the set of points, said selection being based on at least one parameter among:
a difference between a dip at said second point and a dip at the first point is below a first preset value; and
a spacing between the first point and the second point is below a second preset value;
/d/ obtaining a common image gather associated with the second point in said set of points;
/e/ applying a residual move-out analysis algorithm to the common image gather to obtain a correction factor of a physical parameter at said second point;
/f/ applying an inversion algorithm to points between the first point and the second point in the set of points and along a line joining said first point and second point, to obtain an interval value of said physical parameter to update the physical parameter map,
/g/ outputting the interval value of said physical parameter and updating the physical parameter map; and
/h/ displaying a seismic image containing the enhanced physical parameter map.

2. The method of claim 1 wherein the first preset value is based on a scalar product between a unitary vector perpendicular to a dip of the first point and a unitary vector perpendicular to a dip of the second point.

3. The method of claim 1, wherein the second preset value is a value above which a ray normal to the first point misses the second point by more than 5% of the distance separating the first point from the second point.

4. The method of claim 1, wherein the selection of a second point in step /f/ is further based on a parameter expressed as:
for a distance between the first point and points of said set of points smaller than a third preset value, a dip gradient is below a fourth preset value.

5. The method of claim 1, wherein a common image gather associated with the first point in said set of points is obtained and a correction factor of the physical parameter at said second point is obtained by applying a residual move-out analysis algorithm to the common image gather associated with the first point, step /f/ using a correction factor of a physical parameter at said first point and the correction factor of the physical parameter at said second point to obtain an interval value of said physical parameter to update the physical parameter map.

6. The method of claim 1, wherein each point of said set of points is associated to x, y, z coordinates and to a physical parameter v(x,y,z) at said point of coordinates x, y, z, the method further comprising introducing a weighting function W defining a weighting factor w(x,y,z) for each point of the set of points, a physical parameter profile Vp(x,y,z) being obtained at each point of coordinates x, y, z, wherein:

$$Vp(x,y,z)=V(x,y,z)*W(x,y,z)/\Sigma W(x,y,z)$$

where $\Sigma W(x,y,z)$ is a sum of all weighting factors of the set of points.

7. The method of claim 1, wherein an enhanced migration velocity analysis comprising a predetermined number of iterations is implemented, said enhanced migration velocity analysis comprising:
obtaining multi-offset seismic data; and
for each current iteration of said predetermined number of iterations:
/a'/ transforming multi-offset seismic data into a depth-migrated seismic image using a physical parameter map;
implementing steps /a/ to /f/.

8. The method of claim 7, wherein a depth of the first point as a function of offset is determined prior to a current iteration, and the enhanced migration velocity analysis is continued until said depth as a function of offset differs from a depth at zero-offset by less than a fifth preset value.

9. The method of claim 1, wherein a first physical parameter map is estimated based on a migration velocity analysis applied to multi-offset seismic data.

10. The method of claim 1, wherein a seismic ray path is a zero-offset seismic ray path.

11. The method of claim 1, wherein the inversion algorithm is based on a Dix inversion algorithm.

12. The method of claim 1, wherein the physical parameter is a seismic wave velocity.

13. The method of claim 1, wherein the physical parameter is an elasticity coefficient of a medium through which the seismic waves propagate.

14. A non-transitory computer readable storage medium, having stored thereon a computer program comprising program instructions, the computer program being loadable into a data-processing unit and adapted to cause the data-processing unit to carry out a method for enhancing a physical parameter map in a zone of a seismic image, the seismic image formed using a plurality of seismic waves and the application of seismic tomography said method comprising:
/a/ obtaining the zone of the seismic image, said zone comprising a set of points;
/b/ obtaining a dip at each point in the set of points;
/c/ selecting at least a first point in the set of points, and a second point in the set of points, said selection being based on at least one parameter among:
a difference between a dip at said second point and a dip at the first point is below a first preset value; and
a spacing between the first point and the second point is below a second preset value;
/d/ obtaining a common image gather associated with the second point in said set of points;
/e/ applying a residual move-out analysis algorithm to the common image gather to obtain a correction factor of a physical parameter at said second point;
/f/ applying an inversion algorithm to points between the first point and the second point in the set of points and along a line joining said first point and second point, to obtain an interval value of said physical parameter to update the physical parameter map, and
/g/ displaying a seismic image containing the enhanced physical parameter map
when the computer program is run by the data-processing unit.

* * * * *